United States Patent [19]

Barker

[11] 4,029,435
[45] June 14, 1977

[54] RETRACTABLE BLADE FOR A HELICOPTER ROTOR

[76] Inventor: Sidney L. Barker, 1211 N. Westshore Blvd., Tampa, Fla. 33607

[22] Filed: Jan. 29, 1976

[21] Appl. No.: 653,286

[52] U.S. Cl. .................................. 416/88; 416/89; 416/194
[51] Int. Cl.² ...................................... B64C 11/28
[58] Field of Search ............................. 416/87–89, 416/194

[56] References Cited

UNITED STATES PATENTS

| | | | |
|---|---|---|---|
| 970,616 | 9/1910 | Edison | 416/88 |
| 1,115,162 | 10/1914 | Berliner | 416/194 |
| 1,491,972 | 4/1924 | Schiesari | 416/88 |
| 2,072,196 | 3/1937 | Berger | 416/194 X |
| 2,616,509 | 11/1952 | Thomas | 416/88 |
| 3,117,630 | 1/1964 | Barish | 416/88 |
| 3,188,020 | 6/1965 | Nielsen et al. | 416/88 |

FOREIGN PATENTS OR APPLICATIONS

| | | | |
|---|---|---|---|
| 274,534 | 7/1927 | United Kingdom | 416/88 |

*Primary Examiner*—Everette A. Powell, Jr.
*Attorney, Agent, or Firm*—Robert F. Ruemeli

[57] ABSTRACT

A helicopter rotor having retractable blades each having a three dimensional truss including flexible cables which connect a blade member with a pitch member directly secured to a rotor hub, the cables providing for retraction of the blade member to a storage position and permitting the blade member to be adjustably extended to operative positions. With the rotor rotating normally, the resultant centrifugal force acting on the blade and more particularly the blade member, retains the cables under sufficient tension to form an operationally rigid truss which transmits the rotational force of the rotor to the blade member and also adjusts the pitch of the blade member responsive to operation of the pitch member. Two pairs of cables are provided, inner ends of each pair being spaced apart and retained by the pitch member, opposite ends of each pair being secured, one to each of opposite ends of a rigid rod transverse to the blade member and extending outwardly in opposite directions from the blade member. Thus, four triangular truss parts are provided, each truss part including a pair of cables and either the pitch member or the rod on the blade member, with the flexible member intersections connected either with an end of the rigid rod or retained by the pitch member.

6 Claims, 5 Drawing Figures

RETRACTABLE BLADE FOR A HELICOPTER ROTOR

This invention relates to a rotor having retractable blades and, more particularly, to a retractable helicopter rotor blade having a truss with flexible cable for retracting the blade and arranged so as to retain the blade operationally rigid upon normal rotation thereof.

BACKGROUND OF THE INVENTION

Most helicopter rotors in common use today have long blades which must be removed where compactness is required for storage or transportation of the helicopter. During the early 1920's several patents were granted to Schiesari for propellers and combination propellers and helicopter rotors which incorporated blade member secured by flexible cables to a rotor hub, the blade members further being connected to each other by other flexible cables, thus permitting retraction and extension of the blade members, as shown in U.S. Pat. Nos. 1,478,063, 1,491,972, and 1,517,865. A somewhat similar arrangement is shown in U.S. Pat. No. 2,437,789, granted in 1948. A still more recent patent, granted in 1965, U.S. Pat. No. 3,188,020 shows retractable blades in which spaced apart cables are connected by a membrane which forms an airfoil in flight.

A very interesting patent, not only because of the fame of the inventor, but for a showing of a helicopter rotor in which blade members are supported by flexible cables which form a simple truss-like arrangement, is U.S. Pat. No. 970,616, granted to Thomas A. Edison in 1910. Each blade of the Edison rotor uses a pair of wires or cables secured to front and rear ends of a box kite, the cables converging inwardly from the kite to a winding reel near the center of the rotor hub. Each kite is further provided on its trailing end with a cable declining inwardly to another reel on the hub.

BRIEF STATEMENT OF THE INVENTION

The invention, in brief, is directed to a rotor with retractable blades each formed by a three dimensional truss including flexible cables which connect a blade member with a rotating hub of the rotor. The preferred and illustrated embodiment is in the form of a helicopter rotor in which rotation of the rotor retains the cables sufficiently tensioned to provide operationally rigid trusses for conveying both driving and pitch forces to the blade members. Each truss includes triangular truss parts each with a pair of flexible cables and a rigid member, either a portion of the blade member or a pitch member on the hub. Each rigid member is connected with spaced apart ends of one of pairs of the cables, the opposite ends of the pairs being spaced apart and connected with the other of the rigid members.

The invention provides retractable helicopter blades each having a three dimensional or space truss with four flexible members connecting a blade member with a rotating hub, the truss assemblies having sufficient rigidity during normal rotational operation to transmit driving and pitch control forces to the blade members. Basically, this is accomplished by a three dimensional triangular geometry which produces a space truss in which the operational forces produce an excess of tension in all flexible members thus giving such members the ability to resist increments of compression which result in decrease but not reversal of the tensile forces in the flexible members.

The blade member is connected by four flexible cables which pass through two guide holes in opposite ends of a rigid pitch plate and then extend to a winding reel. The reel may be either spring loaded to allow extension of the cables and to provide retraction depending on the magnitude of the centrifugal force, or the reel may be power operated responsive to automatic or manual controls. The pitch plate is rigidly connected to a shaft journaled on the rotor hub so that the pitch plate shaft can be rotated about its longitudinal axis, which is normal to the hub axis, to vary the pitch of the plate which in turn varies the pitch of the plate member. Outer ends of the cables are spaced apart and connected with ends of a rigid rod forming part of the blade member. The six truss members (the pitch plate, blade member rod, and the four flexible cables) form a three dimensional triangulated space truss. Tensile forces in the flexible cables upon normal rotation of the rotor may be thought of as prestressing of the cables which remain stable under increments of compressive load up to but not exceeding the tensile prestressing.

Therefore, a necessary condition for rigidity of the space truss is that the sum of all the simultaneous forces acting on the truss must always produce tension in the flexible cables, and this condition can always be satisfied by selecting a suitable member length relationship. Primary space truss functions which will produce compression increments in the cables are transmission of horizontal drive force shear to the blades member, and transmission of torsional shear to the blade member to change or maintain blade member pitch. Increasing the length of the pitch plate decreases the compression increments caused by drive force shear, and increase tension due to tensile loading. Increasing the length of the blade rod decreases the compression increments caused by pitch torsion, and increases tension due to tensile loading. A length relationship which maintains the necessary excess tension in the cables hinges on sufficient length in the two rigid truss members (the pitch plate and the blade member rod) in relationship to each other.

Blade member orientation can be fixed by addition of two more flexible cables both attached on the inner periphery of the blade member, inner ends of these cables passing through opposite ones of the guide holes in the pitch plate for winding on the adjacent reels. The shape of the blade member shown in the accompanying drawing is arbitrary, and it is necessary to keep the center of lift of the blade member near the blade rod to avoid introduction of large torsional and/or moment forces into the space truss.

It is a primary object of this invention to provide a new and useful aerodynamic rotor and, more particulary, a helicopter rotor. A related object is provision of such a rotor which is operable between a retracted storage position and an extended operational position. Another related object is provision of such a rotor having a blade member supported by a truss assembly including a pair of rigid members, one on the blade member, and flexible cables interconnecting the rigid members.

A more specific object is provision of a new and useful aerodynamic rotor having a hub mounted for rotation about an axis, with a blade mounted on the hub for rotation therewith, the blade including a blade member and a truss assembly including a rigid member on the hub, the truss assembly further including flexible members having adjacent end portions with two groups of the end portions spaced apart transversely of the hub axis and retained spaced apart by the rigid member, the flexible members of said groups forming pairs with the flexible members of another of said groups each pair having an end, the ends being spaced from other of the ends generally in the direction of the hub axis and retained spaced apart by a rigid member on the blade member. Related objects include: provision for moving the blade member between extended operational and retracted storage positions and, more particularly, provision for varying the length of the flexible members for moving the blade member between the retracted and extended positions and for retaining the blade member in an adjusted position between the retracted and extended positions; the rigid member on the hub being a pitch member and provision for rotating the pitch member about an axis and varying the pitch of the blade member and for retaining the pitch member in adjusted position about its axis; and forming a truss including the rigid members and the flexible members, the trusses being operationally rigid for supporting the blade member when the hub is rotating normally and, more particularly, the triangular truss parts each including one of the rigid members and two of the flexible members.

These and other objects and advantages of the invention will be apparent from the following description and the accompanying drawings.

DESCRIPTION OF THE ILLUSTRATED EMBODIMENT

Figure 1:
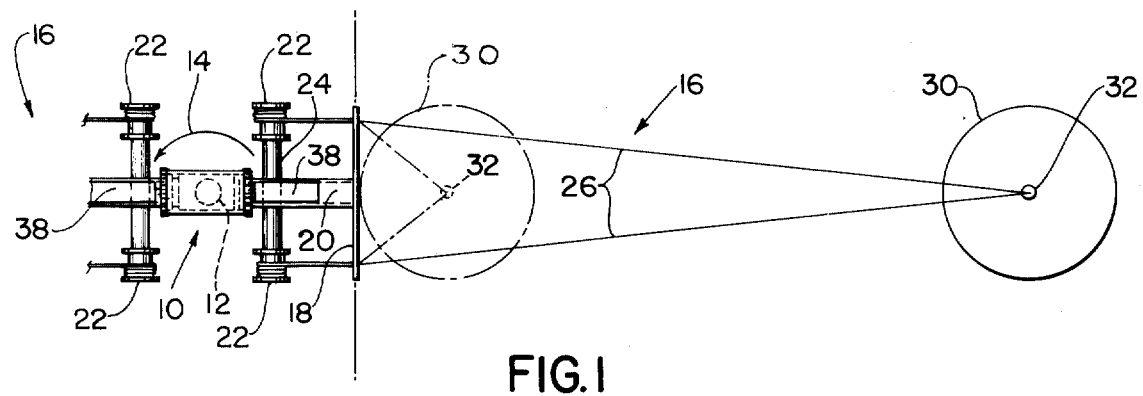
FIG. 1 is a schematic, fragmentary plan view of a preferred embodiment of a helicopter rotor with a blade in operative fully extended no-lift position, the blade being shown in phantom lines in retracted, storage position.

Referring to the drawings, FIG. 1 shows a helicopter rotor having a hub 10 mounted for rotation about a hub axis defined by a normally vertical rotor shaft 12 rotated in a counterclockwise direction when viewed from above as indicated by the arrow 14. Rotor 10 carries a pair of diametrically opposed blades 16, only one of the blades being shown in its entirety. Each blade 16 includes a relatively rigid pitch first member 18 fixedr to a shaft 20 journaled in the hub 10 for rotation about an axis transverse and generally normal to the axis of the rotor shaft 12 and extending substantially radially from this shaft. A pair of winding reels 22 are fixed to a common shaft 24 which is journaled on the pitch member shaft 20 for rotation transverse and generally normal to shaft 20. Each reel 22 carries a group of two flexible cables 26 (FIG. 4) which extend through an adjacent one of a pair of apertures 28 in the pitch member 18 and equally spaced on opposite sides of the pitch member shaft 20. The cables, one from each of the opposite groups, form pairs, each pair of cables 26 extending to the pitch member 18 outwardly from either side of a blade member 30 carries a midportion of a rigid rod (second) member 32. The intersection of one of the cable pairs is secured to an upper end of the rod member 32 and the intersection of the outer pair is secured to the lower end of the rod member 32.

With the rotor rotating normally about its shaft 12, centrifugal force resulting from the rotation retains the cables 26 taut, and in combination with the pitch member 18 and the rod 32 form an operationally rigid truss assembly. More particularly, there are four triangular truss parts, two of the truss parts having a rigid leg formed by the pitch member 18 and the other two truss parts having a rigid leg formed by the rod member 32 of the blade member 30.

Figure 2:
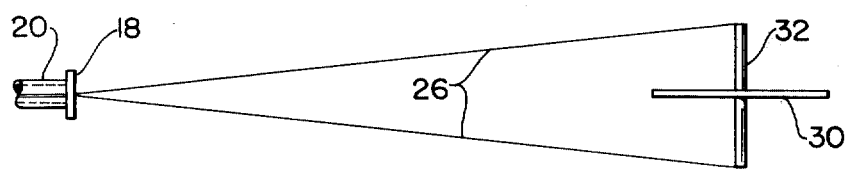
FIG. 2 is a schematic, fragmentary elevation view of the blade shown in FIG. 1.
Figure 3:
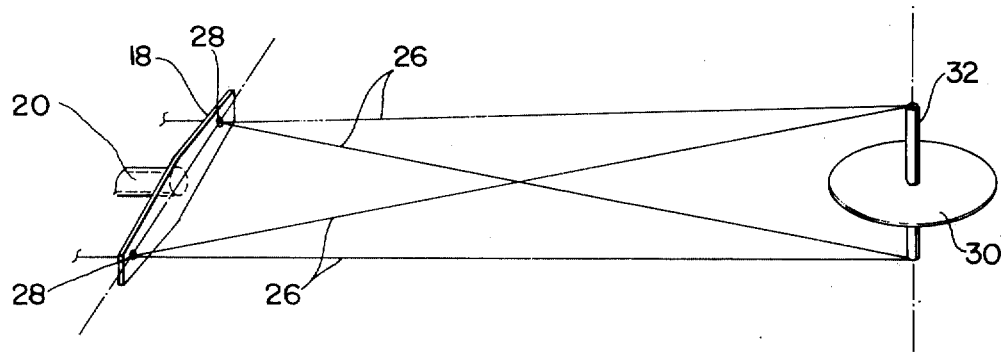
FIG. 3 is a schematic, fragmentary perspective view of the blade shown in FIGS. 1 and 2.

In FIGS. 1-3, the blade is shown in solid lines in its fully extended no-lift position in which the blade member 30 is substantially horizontal and the rod 32 is substantially vertical. From this operative position the blade may be retracted to the phantom line position shown in FIG. 1 by operation of the pair of reels 22 to reel in the cables 26, as will be described later with reference to FIG. 5. The extended position of the blade member 20 may be at any suitable point between the retracted and fully extended positions by simply limiting the length of the cables retained on the reels 22.

Figure 4:
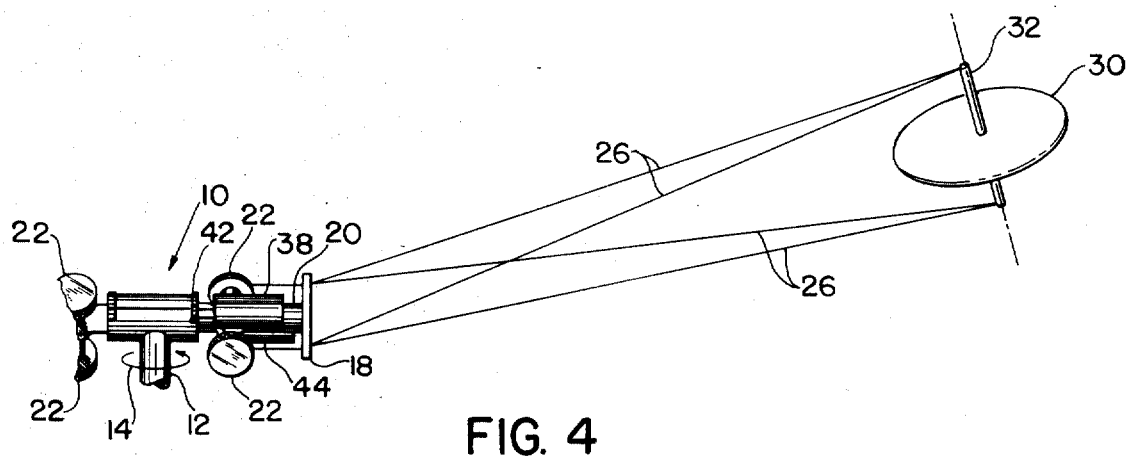
FIG. 4 is a schematic, fragmentary, perspective view, similar to FIG. 3, but with the blade in a lifting position.

By rotating the pitch member 18, as will be described later with reference to FIG. 5, the pitch of the blade 30 may be varied, as shown in FIG. 4, so that the rotor provides an upward force to lift the helicopter.

Figure 5:
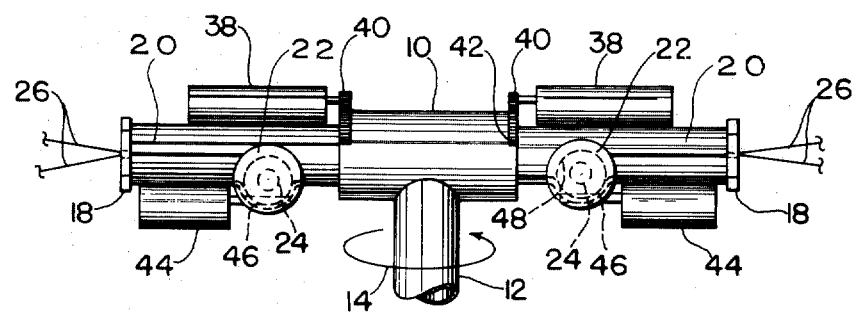
FIG. 5 is a schematic, fragmentary, elevational view of the rotor hub shown in FIG. 1.

With reference to FIG. 5, the pitch member 18 may be rotated in any suitable manner as by a motor 38 fixedly secured to the pitch member shaft 20, the motor shaft being fixed to a pinion 40 drivingly engaged with an arcuate rack 42 fixed to the hub 10, so that upon operation of the motor 38 the pinion 40 is driven in mesh engagement along the rack 42 and thereby rotates the pitch member 18. The motor is controlled to hold the pitch member in any desired adjusted position. Reels 22 are rotated by a second motor 44 also operatively fixed on the pitch member shaft 20, this motor drive shaft carrying a worm 46 meshed with a gear 48 on the reel shaft 24 intermediate the reels 22. Upon rotation of the reels 22 in one direction the cables 26 are permitted to be withdrawn from the reels responsive to centrifugal force acting on the blade member 30 as the rotor is rotated normally as shown by the arrow 14 in FIG. 1, and upon reverse rotation of the reels 22 responsive to operation of the motor 44, the cables and blade member are retracted.

While the blade member 30 is shown schematically as a disc, the preferred shape of the blade member will depend on the operating characteristics of the blade and may be of any form found to be most efficient.

While this invention has been described and illustrated with reference to a particular embodiment in a particular environment, various changes may be apparent to one skilled in the art and the invention is therefore not to be limited to such embodiment or environment, except as set forth in the appended claims.

What is claimed is:

1. An aerodynamic rotor comprising, a rotor hub mounted for rotation about an axis, a blade mounted on said hub for rotation therewith, said blade including a blade member and a three dimensional, generally triangular truss; said truss including four flexible members and two rigid members each having opposite ends, a mid-portion of a first of said rigid members being attached to said hub and being generally transverse to said hub axis, a mid-portion of a second of said rigid members being attached to said blade member and being generally parallel to the hub axis, said flexible members forming pairs, said pairs each having spaced apart first ends, one for each of opposite ends of the first rigid member and secured thereto for free movement laterally thereof, said pairs each having a second end, one of the second ends being attached to one end of the second rigid member, and the other of the second ends being attached to the opposite end of said second rigid member, and means operable for rotating said hub about said axis at sufficient speed that operational loads create an excess of tension in all said flexible members and create a rigid three dimensional truss during operation of the rotor.

2. A rotor as set forth in claim 1 in which the first rigid member is a pitch member mounted on said hub for rotation about an axis transverse to said hub axis, and means for rotating said pitch member about its axis and varying the pitch of said blade member.

3. A rotor as set forth in claim 1 including means for extending and retracting said flexible members relative to said second rigid member and positioning said blade member in extended operational and retracted storage positions, respectively.

4. A rotor as set forth in claim 3 in which the last said means varies the length of said flexible members in moving said blade member between said positions.

5. A rotor as set forth in claim 4 in which the last said means retains said blade member in selected adjusted position between the extended and retracted positions.

6. A rotor as set forth in claim 5 in the form of a helicopter rotor and in which said rigid member on said hub is a pitch member mounted for rotation about an axis transverse to said hub axis, and means for rotating said pitch member about its axis and varying the pitch of said blade member and for retaining said pitch member in adjusted position about its axis.

* * * * *